May 12, 1925.

R. H. BLISS 1,537,740

HEATING ELEMENT

Filed March 12, 1923     2 Sheets-Sheet 1

INVENTOR
Richard H. Bliss,
BY Bates & Macklin,
ATTYS.

May 12, 1925.

R. H. BLISS

HEATING ELEMENT

Filed March 12, 1923     2 Sheets-Sheet 2

1,537,740

INVENTOR
Richard H. Bliss,
By Bates & Macklin
ATTORNEYS

Patented May 12, 1925.

1,537,740

UNITED STATES PATENT OFFICE.

RICHARD H. BLISS, OF CLEVELAND, OHIO, ASSIGNOR TO ROGERS ELECTRICAL LABORATORIES COMPANY, OF CLEVELAND, OHIO, A CORPORATION OF MAINE.

HEATING ELEMENT.

Application filed March 12, 1923. Serial No. 624,526.

*To all whom it may concern:*

Be it known that I, RICHARD H. BLISS, a citizen of the United States, residing at Cleveland, in the county of Cuyahoga and State of Ohio, have invented a certain new and useful Improvement in Heating Elements, of which the following is a full, clear, and exact description, reference being had to the accompanying drawings.

This invention is concerned with electric stoves and heaters and has for its general object, the provision of a compact, durable heating unit comprising a heating coil supporting member which also comprises the body of the heater. A more specific object of my invention is the provision of an electric heating element of the open radiating type which is formed of heat resisting and electrically non-conductive material molded to produce an element support adapted to receive and retain the heating coil. By the present invention, I avoid other holding means for the coil, while permitting complete radiating exposure of the coil.

Other objects of my invention will hereinafter be set forth in the following description which relates to the accompanying drawings illustrating a preferred embodiment thereof. The essential characteristics are summarized in the claims.

Figure 1:
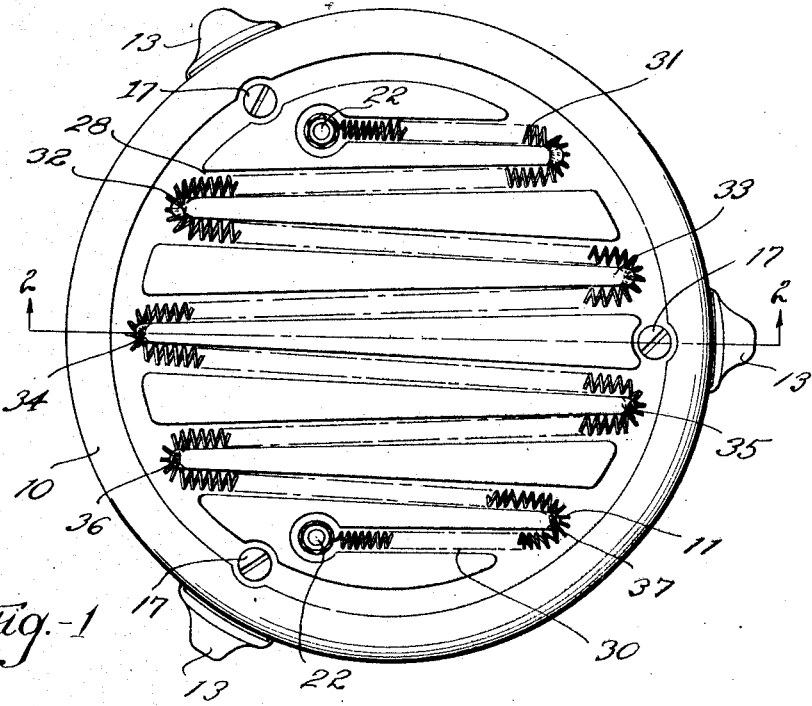
Figure 2:
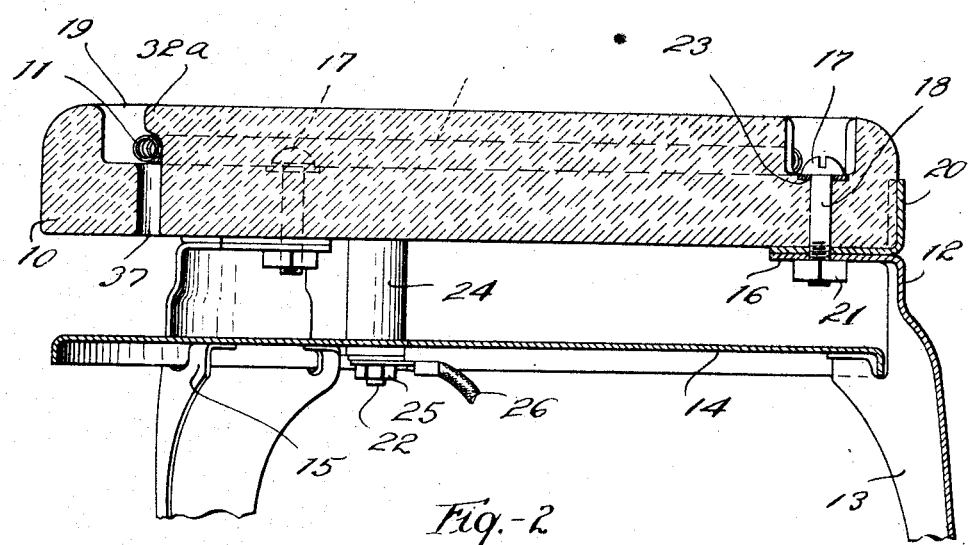
Figure 3:
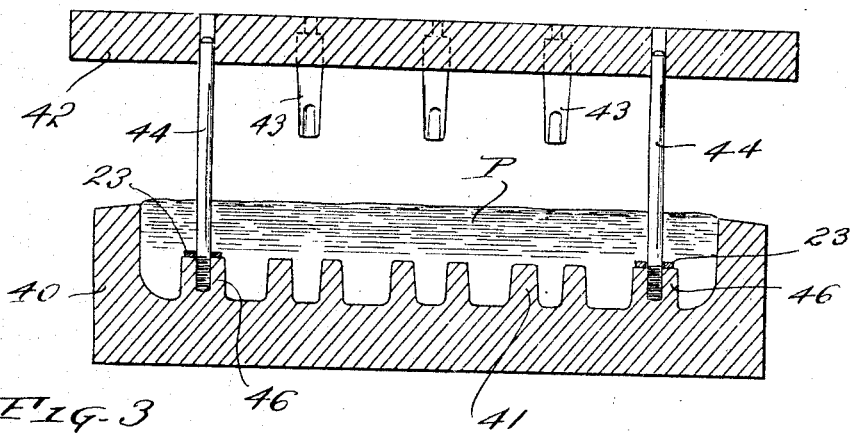
Figure 4:
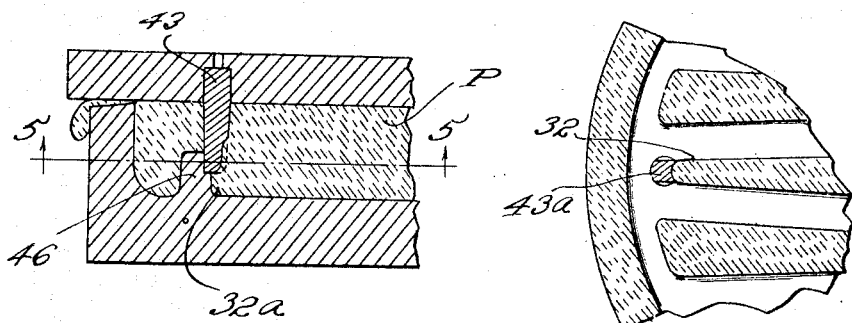
Figure 5:
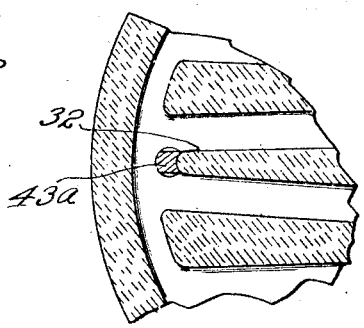

In the drawings, Fig. 1 is a plan view of a heating or cooking device embodying my invention; Fig. 2 is a cross-sectional elevation taken along the line 2—2 of Fig. 1; Fig. 3 is a cross-sectional view taken through a mold adaptable for the forming of the body member of my heating device; Fig. 4 is an enlarged cross-sectional view taken through the end of the mold when closed; Fig. 5 is an enlarged fragmentary cross-sectional view taken through the supporting member of the heating element.

My invention contemplates the use of a non-metallic body member for the heating device which may be molded from asbestos plastic or similar suitable heat resisting and electrically non-conductive material, and which may have sufficient tensile strength after having been baked, whereby it may be used as the body member or utensil support of the heating device.

I also contemplate the molding of such a member in a manner which will effect the formation of a series of grooves or recesses in the upper supporting face of the body member, the grooves being made in a novel manner whereby the simplest form of heating element, namely, a spiral resistance coil may be placed in the grooves thereof in a zig zag fashion and be retained therein, once the ends of the coil have been suitably secured to the terminals of the heating device.

In Figs. 1 and 2, I show an electrical heating device adaptable for cooking, grilling, boiling and the like, which may comprise a molded body member 10, having grooves formed therein in a manner to be presently described and which are adaptable for the reception and retention of a continuous heating coil 11.

The body member 10 is mounted on upper extensions 12 of metallic legs 13, which are formed to provide a convenient attachment to the body member 10 and to a bottom disc member 14. Inwardly projecting lugs 15 are formed on the legs a suitable distance below body supporting ears 16 thereof, whereby the body member 10 and the disc member 14 when secured to the legs may have a substantial space therebetween. Any suitable fastening means may be used to secure the body member 10 to the legs such as bolt members 17, passing through suitable openings 18, formed in the body member centrally of an annular groove 19, extending around the top of the body member 10 adjacent the perimeter thereof. Reinforcing angular members 20 may be provided between the leg ears and body member to permit a substantial tightening of the bolt members 18 by a nut member 21, the angular members 20 also serving to distribute any unusual shocks upon the legs 13, in the event it should be accidentally dropped.

The ends of the heating coil 11 may be connected directly to terminal bolts 22, which are positioned in suitable openings, extending through the body member 10 to a position beneath the disc or plate member 14. Porcelain sleeves 24 may serve to properly insulate the terminal bolts 22, as well as to act as spacing means between the body member and the disc member when the nut members 25 are tightened on the terminal bolts 22. Lead wires 26 may be directly secured to the terminal bolts by the nut members 25.

The specific arrangement of the grooves and openings of the body member 10 which receive the heating coil 11 may be more conveniently described by referring to the manner in which I prefer to manufacture the body member 10.

It will be seen in Fig. 1 that the heating element 11 is laid in a series of non-parallel grooves 28 and 29 which are formed in the upper face of the body member 10 and terminate in the annular groove 19. The grooves are of sufficient width to provide slight clearance between the walls thereof and the heating coil 11, when the coil is not heated.

Parallel end grooves 30 and 31 extend from one side of the body member 10 and terminate in enlarged circular depressions in the nature of counterbores for the openings through which the terminal lugs 22 pass.

The alternate corners where the grooves converge are formed to provide overhanging edges 32$^a$ whereby the coil when laid in the grooves in zig zag fashion and when bent about the corner 32 will be maintained in the lowermost portions of the grooves by the overhanging edges 32$^a$. Directly under these overhanging edges are openings 37 which serve as vents to permit circulation of air through the grooves and around the heating element when the top of the body member 10 is completely covered, as for instance, by a cooking utensil and likewise serve as a drain in case liquid leaks from the utensil into the respective grooves. These openings are formed by core members which are used in the plastic mold when the overhanging edges are formed as will now be described.

As illustrated in Figs. 3, 4, and 5, a mold member 40 having ribs 41 projecting upwardly into the molding cavity thereof, is provided with a cope member 42 upon which I prefer to arrange core pins 43. Match pins 44 may be carried by the mold to guide the cope member 40 and also serve as core members for forming openings 18 for the leg bolts 17.

The core pins 43 have the ends thereof shaped to form the overhanging edges 32$^a$ which retain the heating coil in the grooves of the body member, as well as to form vent opening 37, as shown in Fig. 4. The core members 43 extend downwardly and come to rest in a suitable notch formed in an annular molding rib 46, which forms the annular groove 19 in the body member. The core members 43 also have the inner edges thereof, suitably relieved to effect a rounded formation of the rib ends 32, as illustrated in Fig. 5, whereby the heating coil when laid in the grooves may be suitably rounded without causing an unusual separating of the respective turns thereof. If desired the washer members 23 may be positioned on core pins 44 before the plastic material is placed in the mold member 40. The washer members 23, will thus be molded into seated position and become fixed in the annular groove 19.

From the foregoing description, it may be readily understood that my invention provides a simple, compact electrical heating device which is adaptable to economic production in the manufacturing thereof and involves only the use of elements of a very simple character. Furthermore, I provide a method of molding the main member of the heating device, namely, the element supporting or coil carrying member whereby I eliminate the use of any and all auxiliary coil holding devices, while exposing the entire length of the heating coil, thus obtaining a high heat radiating efficiency. I provide vent openings which insure the proper protection and longevity of the heating coil regardless of whether the coil grooves are closed during a protracted cooking period or whether the grooves are accidentally filled with liquid when the device is used for cooking purposes.

I claim:—

1. In an electrical heater of the character described, a utensil supporting member formed of heat resisting and electrically non-conductive material, said member having an annular groove formed in the top surface thereof and a plurality of grooves extending in a common direction and communicating at each end with the annular groove, the walls of the annular groove being undercut adjacent the ends of the grooves extending thereinto.

2. In an electrical heater of the character described, a heating unit comprising a molded utensil supporting member, having a plurality of grooves formed in the face thereof, each groove converging toward an adjacent groove and the grooves terminating in an annular groove formed in the upper face of said member and extending adjacent the perimeter thereof, the walls of said adjacent grooves being undercut in the region of their convergence, whereby a continuous electrical heating coil may be laid in an end groove and extend throughout all of the grooves in a zig zag fashion and be retained therein by reason of the engagement thereof, with said undercut portions of the groove walls.

3. In an electrical heater of the character described, the combination of a utensil supporting member comprising a heating coil support formed of molded material, said member having a plurality of converging grooves formed in the upper face thereof, and an annular groove extending around the perimeter of the member and affording communication between the respective grooves, a heating element comprising a resistance coil laid in zig zag fashion to extend from one groove to another, the return bends of the coil being formed at the converging ends of the said grooves and extending into said annular groove, the groove walls adjacent said return bends of the coils being undercut to prevent displacement of the heating coil when once placed in said grooves.

4. An electrical hot plate, comprising a molded member formed of a heat resisting and an electrically non-conductive material, said member having a plurality of grooves formed in the upper face thereof, said grooves being undercut to retain an electrical heating coil therein, and having a plurality of openings extending from the grooves to the under side thereof, said openings being formed adjacent the undercut portion of said groove walls.

5. The method of forming a heating element supporting member for an electrical heater, comprising constructing the molds with a series of ribs in the bottom thereof, corresponding inversely to cavities to be formed in the top surface of the element supporting member, placing a series of removable core pins in the top part of the mold, superposing said top part upon the rib carrying mold member after plastic material has been placed therein, bringing said mold members together, permitting the plastic material molded therein to set, removing the top member while permitting said core pins to remain in the molded material, removing said core pins from the underside of the molded member, whereby a series of openings are formed in the molded member and the grooves formed in the top surface thereof will have openings disposed adjacent the undercut portion of the wall.

In testimony whereof, I hereunto affix my signature.

RICHARD H. BLISS.